(12) United States Patent
Cao

(10) Patent No.: US 10,978,075 B2
(45) Date of Patent: Apr. 13, 2021

(54) INITIALIZATION METHOD AND DEVICE FOR SMART HOME

(71) Applicant: Beijing Xiaomi Mobile Software Co., Ltd., Beijing (CN)

(72) Inventor: Dingpeng Cao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 201 days.

(21) Appl. No.: 16/014,317

(22) Filed: Jun. 21, 2018

(65) Prior Publication Data

US 2018/0374485 A1 Dec. 27, 2018

(30) Foreign Application Priority Data

Jun. 21, 2017 (CN) .......................... 2017 1 0475818

(51) Int. Cl.
*G10L 15/30* (2013.01)
*G10L 17/00* (2013.01)
(Continued)

(52) U.S. Cl.
CPC ................ *G10L 17/00* (2013.01); *G06F 9/44* (2013.01); *G10L 15/063* (2013.01);
(Continued)

(58) Field of Classification Search
CPC ... G10L 15/22; G10L 2015/233; G10L 15/00; G10L 15/144; G10L 2015/088;
(Continued)

(56) References Cited

U.S. PATENT DOCUMENTS 9,491,571 B2 * 11/2016 Karp .................. G05D 23/1904
9,838,830 B2 * 12/2017 Lyons .................... G05B 15/02
(Continued)

FOREIGN PATENT DOCUMENTS

CN 1645476 A 7/2005
CN 103781191 A 5/2014
(Continued)

OTHER PUBLICATIONS

Office Action dated Aug. 29, 2019 in Japanese Patent Application No. 2017-552143.
(Continued)

*Primary Examiner* — Vijay B Chawan
(74) *Attorney, Agent, or Firm* — Oblon, McClelland, Maier & Neustadt, L.L.P.

(57) ABSTRACT

The disclosure relates to an initialization method for the smart home and the device thereof. The method includes receiving an initialization audio signal played by a target device, wherein the initialization audio signal is an audio signal of target characters obtained by encoding source data of initialization data for the smart home; decoding the initialization audio signal based on pre-stored correspondences between pre-set characters and source data of the pre-set characters so as to obtain the source data of the initialization data, wherein the pre-set characters include at least the target characters; and initializing the smart home based on the source data of the initialization data.

13 Claims, 7 Drawing Sheets

(51) Int. Cl.
*H04L 12/28* (2006.01)
*H04M 1/725* (2021.01)
*G06F 9/44* (2018.01)
*G10L 15/06* (2013.01)
*G10L 15/22* (2006.01)
*H04M 1/60* (2006.01)

(52) U.S. Cl.
CPC ........ *H04L 12/282* (2013.01); *H04L 12/2814* (2013.01); *H04M 1/72533* (2013.01); *G10L 2015/223* (2013.01); *H04M 1/6016* (2013.01)

(58) Field of Classification Search
CPC ........ G05B 15/02; G05B 17/02; G05B 13/04; G05B 13/0265; G05B 13/028; H04L 12/2803; H04L 12/2818; H04L 29/06047; H04L 63/08; H04L 67/1097; H04L 67/30; H04L 67/42; H04L 67/12; H04L 67/2812; H04L 12/66; H04L 41/0806; H04L 2112/2841; H04L 2012/285; H04M 1/72533; H04M 1/72522; H04M 2250/45595; H04M 2250/74; H04W 4/021; H05B 47/19
USPC ............. 704/270.1, 270, 275; 700/276, 275; 709/203, 222, 223
See application file for complete search history.

(56) References Cited

U.S. PATENT DOCUMENTS

| | | | | |
|---|---|---|---|---|
| 9,854,386 | B2* | 12/2017 | Karp | H04L 12/2829 |
| 9,869,484 | B2* | 1/2018 | Hester | F24F 11/30 |
| 9,933,177 | B2* | 4/2018 | Hester | G05B 15/02 |
| 10,453,098 | B2* | 10/2019 | Zomet | H04L 12/2834 |
| 2005/0159951 | A1 | 7/2005 | Attias et al. | |
| 2008/0248797 | A1* | 10/2008 | Freeman | H04M 1/72533 455/425 |
| 2008/0298305 | A1 | 12/2008 | Nakamura | |
| 2013/0072080 | A1* | 3/2013 | Garbos | A63H 33/26 446/26 |
| 2014/0040444 | A1* | 2/2014 | Lee | H04L 41/0806 709/222 |
| 2014/0086018 | A1* | 3/2014 | Chi | G08C 23/02 367/197 |
| 2014/0098247 | A1 | 4/2014 | Rao et al. | |
| 2014/0229184 | A1 | 8/2014 | Shires | |
| 2014/0286931 | A1 | 9/2014 | Cho et al. | |
| 2015/0133109 | A1 | 5/2015 | Freeman et al. | |
| 2015/0349975 | A1* | 12/2015 | Hu | H04L 12/282 709/223 |
| 2015/0372833 | A1* | 12/2015 | Karp | H04L 12/2803 700/275 |
| 2015/0372999 | A1* | 12/2015 | Pi-Sunyer | G05B 13/04 726/4 |
| 2015/0373149 | A1* | 12/2015 | Lyons | H04M 1/72533 709/203 |
| 2016/0123619 | A1* | 5/2016 | Hester | G05B 13/028 700/276 |
| 2016/0201933 | A1* | 7/2016 | Hester | F24D 19/1084 700/276 |
| 2016/0225372 | A1 | 8/2016 | Cheung et al. | |
| 2016/0260135 | A1* | 9/2016 | Zomet | H04L 67/22 |
| 2016/0261425 | A1* | 9/2016 | Horton | G05D 23/1904 |
| 2017/0084274 | A1 | 3/2017 | Kim et al. | |
| 2017/0116994 | A1* | 4/2017 | Wang | G10L 15/144 |
| 2017/0192402 | A1* | 7/2017 | Karp | F24F 11/30 |
| 2018/0376313 | A1* | 12/2018 | Horton | H04L 67/42 |

FOREIGN PATENT DOCUMENTS

| | | |
|---|---|---|
| CN | 103929595 A | 7/2014 |
| CN | 103984666 A | 8/2014 |
| CN | 106506294 A | 3/2017 |
| CN | 103166702 A | 6/2018 |
| JP | 10-341286 A | 12/1998 |
| JP | 2005-208648 A | 8/2005 |
| JP | 2008-211507 A | 9/2008 |
| KR | 10-2005-0076696 A | 7/2005 |
| RU | 2 573 762 C1 | 1/2016 |
| WO | WO 2016/160722 A1 | 10/2016 |
| WO | WO 2017/086772 A1 | 5/2017 |
| WO | WO 2018/232891 A1 | 12/2018 |

OTHER PUBLICATIONS

Extended European Search Report dated Jul. 12, 2018 in Patent Application No. 18163907.1, 10 pages.
Combined Office Action and Search Report dated Sep. 25, 2018 in Russian Patent Application No. 2017145340/08 (with English translation of categories of cited documents), 8 pages.
International Search Report issued in PCT/CN2017/096788 dated Feb. 24, 2018.
Indian Office Action with English translation dated Nov. 9, 2020 in counterpartIndian Application No. 201737042856, (6 pages).

* cited by examiner

INITIALIZATION METHOD AND DEVICE FOR SMART HOME

CROSS-REFERENCE TO RELATED APPLICATIONS

The present disclosure is based on and claims priority to Chinese Patent Application Serial No. 201710475818.2, filed on Jun. 21, 2017, the entire contents of which are incorporated herein by reference.

TECHNICAL FIELD

The present disclosure relates to the technical field of a smart home, and more particularly to an initialization method and device for a smart home.

BACKGROUND

In the related technology, smart home cannot be connected to the network before its initialization is completed. So, to complete the initialization of the smart home, it is typical to send initialization data to the smart home by means of short-range communication, such as Bluetooth, etc. However, the short-range communication has strict requirements for the version of hardware supporting the short-range communication, such as Bluetooth, etc., as well as for the transmission distance. In practical applications, these requirements cannot be satisfied in most circumstances, which may result in low efficiency of initialization data input. For example, if the version of the hardware is too low, then the initialization data cannot be sent to the smart home by means of short-range communication, or the distance is too far to send the initialization data.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for initializing a smart home. The method includes receiving an initialization audio signal played by a target device, wherein the initialization audio signal is an audio signal of target characters obtained by encoding source data of initialization data for the smart home; decoding the initialization audio signal based on pre-stored correspondences between pre-set characters and source data of the pre-set characters so as to obtain the source data of the initialization data, wherein the pre-set characters include at least the target characters; and initializing the smart home based on the source data of the initialization data.

According to an aspect, when decoding the initialization audio signal based on the pre-stored correspondences between the pre-set characters and the source data of the pre-set characters, the method includes recognizing the initialization audio signal to obtain the target characters; and obtaining the source data of the initialization data based on the target characters and the correspondences between the pre-set characters and the source data of the pre-set characters.

According to another aspect, before recognizing the initialization audio signal to obtain the target characters, the method includes training the smart home based on the audio signal of the pre-set characters so that the smart home recognizes the pre-set characters; and storing the pre-set characters and the source data of the pre-set characters so as to obtain the correspondences.

In an example, the target characters are characters obtained from the target device by encoding the source data of the initialization data based on the correspondences between the pre-set characters and the source data of the pre-set characters.

In another example, the source data of the initialization data includes at least one of binary code, octal code, and hexadecimal code of the initialization data.

According to an aspect, when initializing the smart home based on the source data of the initialization data, the method includes at least one of: the smart home being controlled to be networked based on the source data of the initialization data; storing corresponding user information of the smart home based on the source data of the initialization data; and displaying available functional options based on the source data of the initialization data.

Aspects of the disclosure also provide a device for initializing a smart home. The device includes circuitry configured to receive an initialization audio signal played by a target device, wherein the initialization audio signal is an audio signal of target characters obtained by encoding source data of initialization data for the smart home; decode the initialization audio signal based on pre-stored correspondences between pre-set characters and source data of the pre-set characters so as to obtain the source data of the initialization data, wherein the pre-set characters include at least the target character; and initialize the smart home based on the source data of the initialization data.

Aspects of the disclosure also provide a non-transitory computer-readable storage medium storing instructions that, when executed by one or more processors of a computing device, cause the computing device to receive an initialization audio signal played by a target device, wherein the initialization audio signal is an audio signal of target characters obtained by encoding source data of initialization data for the smart home; decode the initialization audio signal based on pre-stored correspondences between pre-set characters and source data of the pre-set characters so as to obtain the source data of the initialization data, wherein the pre-set characters include at least the target character; and initialize the smart home based on the source data of the initialization data.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Currently, the smart home cannot be networked before completing the initialization thereof, so it is usual to send initialization data to the smart home by means of short-range communication, such as Bluetooth, etc. so as to complete the initialization of the smart home. However, the short-range communication has strict requirements on the version of hardware supporting the short-range communication, such as Bluetooth, etc., as well as on the transmission distance. In practice, these requirements cannot be satisfied at most circumstances, thus leading to low initialization data input efficiency. For example, if the version of above hardware is too low, then the initialization data cannot be sent to the smart home by means of the short-range communication, or the distance is too far to send the initialization data.

Figure 1:
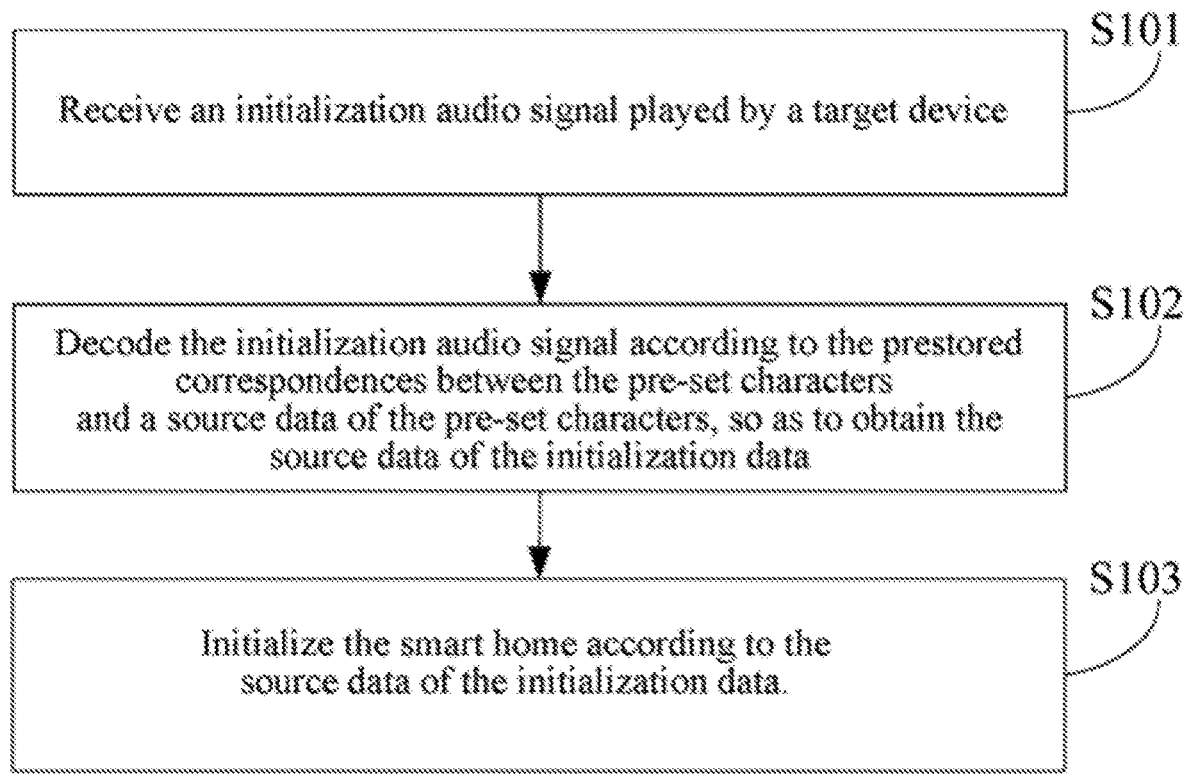
FIG. 1 is a flow chart illustrating a smart home initialization method according to an exemplary aspect of the present disclosure.

To solve the aforesaid technical problems, an initialization method for the smart home is provided in the present disclosure. The method may be used in the initialization programs, systems and devices for the smart home. And, the method may be performed by smart home products, such as, intelligent speaker, intelligent refrigerator, intelligent washing machine, intelligent rice cooker, and etc. The method may include step S101 to step S103, as shown in FIG. 1.

In step S101, an initialization audio signal played by a target device is received, wherein the initialization audio signal is an audio signal of the target characters obtained by encoding the source data of the initialization data for the smart home.

The source data of the initialization data includes but not limited to binary code, octal code and hexadecimal code of the initialization data.

The target devices may be a terminal device configured to receive/store the source data of the initialization data, such as, a mobile phone.

In step S102, the initialization audio signal is decoded according to the pre-stored correspondences between the pre-set characters and source data of the pre-set characters, so that the source data of the initialization data is obtained, wherein the pre-set characters at least include target characters.

The pre-set characters include but not limited to the target character. Other characters other than the target characters can also be included.

In step S103, the smart home is initialized according to the source data of the initialization data.

Upon receipt of the initialization audio signal of the smart home, the initialization audio signal may be automatically decoded according to the pre-stored correspondences between the pre-set characters and the source data of the pre-set characters, so as to obtain the source data of the initialization data. And then, the smart home is automatically initialized according to the source data of the initialization data. In this way, the input efficiency of the initialization data is improved by initializing the audio signal and the initialization of the smart home can be automatically completed, without too strict requirements on the hardware of the smart device and the target device, and also on the communication distance.

Figure 2:
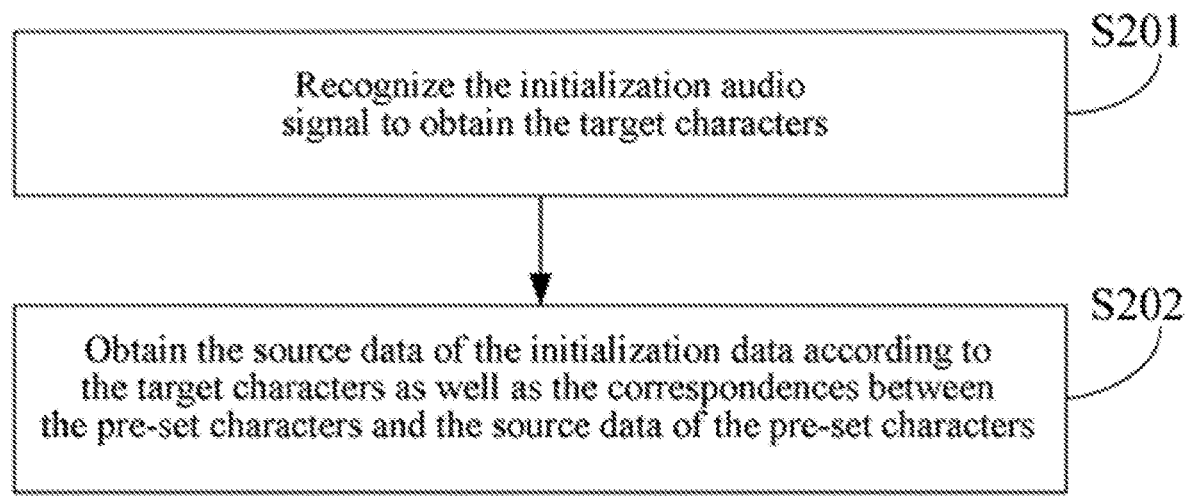
FIG. 2 is a flow chart illustrating another smart home initialization method according to an exemplary aspect of the present disclosure.

As shown in FIG. 2, in one aspect, the step S102 as shown in FIG. 1, i.e., decoding the initialization audio signal according to the pre-stored correspondences between the pre-set characters and the source data of the pre-set characters so as to obtain the source data of the initialization data, may include step S201 and step S202.

In step S201, the initialization audio signal is recognized to obtain the target characters.

In step S202, the source data of the initialization data is obtained according to the target characters as well as the correspondences between the pre-set characters and the source data of the pre-set characters.

In the process of decoding the initialization audio signal, the initialization audio signal of the target characters can be recognized first, so as to accurately recognize the target characters, and then the source data of the initialization data can be determined accurately according to the target characters and the correspondences between pre-set characters and the source data of the pre-set characters.

Figure 3:
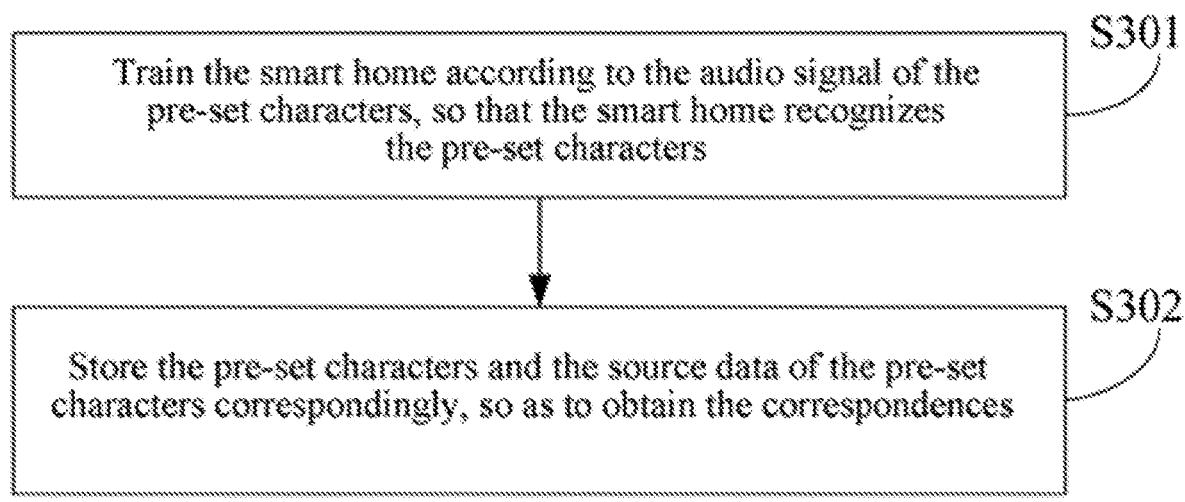
FIG. 3 is a flow chart illustrating yet another smart home initialization method according to an exemplary aspect of the present disclosure.

As shown in FIG. 3, in one aspect, before executing step S201 as shown in FIG. 2, i.e., recognizing the initialization audio signal to obtain the target characters, the above method may further include step S301 and step S302.

In step S301, the smart home is trained according to the audio signal of the pre-set characters, so that the smart home recognizes the pre-set characters.

In step S302, the pre-set characters and the source data of the pre-set characters are stored correspondingly, so as to obtain the correspondences.

The smart home may be provided with a voice recognition function. By training the smart home according to the audio signal of the pre-set characters, the trained pre-set characters can be accurately recognized. Thus, the target characters of the initialization audio signal can be accurately recognized locally without internet once receiving the initialization audio signal. Of course, the source data of the initialization data could be varied, and thus the initialization audio signal may be varied accordingly. Therefore, the number of the pre-set characters may be appropriately increased to achieve a relatively high voice recognition ratio of the smart home.

By correspondingly storing the pre-set characters and the source data of the pre-set characters, the corresponding source data, i.e. the source data of the initialization data, can be accurately determined according to the recognized target characters.

In one aspect, the target characters are obtained from the target device by encoding the source data of the initialization data according to the correspondences between the pre-set characters and the source data of the pre-set characters.

Since the target device receives the source data of the initialization data, the source data of the initialization data can be encoded as target characters that can be automatically recognized by the smart devices according to the correspondences between the pre-set characters and the source data of the pre-set characters, so that the smart home can obtain the source data of the initialization data by decoding the source data.

In one aspect, the source data of the initialization data includes at least one of the following:

Binary code, octal code and hexadecimal code of the initialization data.

The source data of the initialization data includes but not limited to the above types. A person skilled in the art can input different types of source data if necessary, which is not limited in the present disclosure.

Of course, the source data of the pre-set characters also includes other types that are different from the types listed above, and the pre-set characters may be numbers, letters or Chinese characters, etc.

In one aspect, initializing the smart home according to the source data of the initialization data includes at least one of the following:

Controlling the smart home so that it is networked according to the source data of the initialization data;

Storing the corresponding user information of the smart home according to the source data of the initialization data;

Displaying available functional options according to the source data of the initialization data.

The content of the initialization data may include but not limited to the network information of the smart home (such as, the connected WIFI and the connection password of the WIFI), user information (such as, the administrator's information of the smart home, etc., like the account name and the login password of the administrator), the functions need to be enabled. Therefore, the operations, such as, networking, user information storing, available functional options displaying and etc., for the smart home are performed according to the source data of the initialization data. Thus, the initialization operation for the smart home can be automatically completed in response to voice commands. In such a method, there will be no extra requirements on the hardware of the smart home and the target device as well as the distance and etc.

Figure 4:
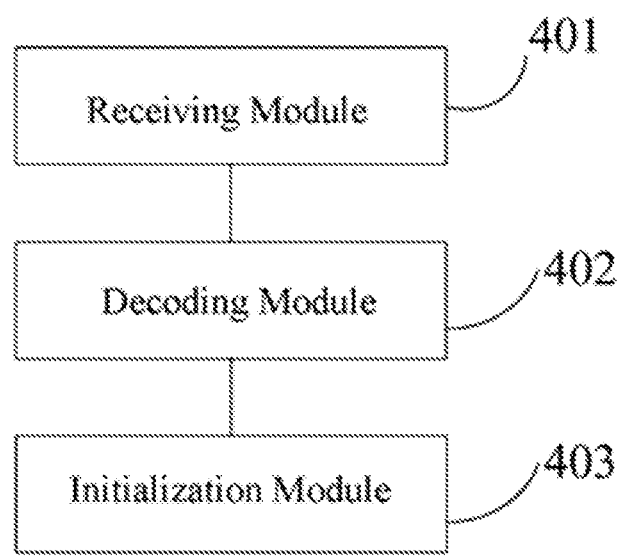
FIG. 4 is a block diagram illustrating a smart home initialization device according to an exemplary aspect of the present disclosure.

Corresponding with the initialization method for the smart home provided in the aspects of the present disclosure, an initialization device for the smart home is also provided in the aspects of the present disclosure, as shown in FIG. 4. The device includes:

Receiving module 401, configured to receive the initialization audio signal played by a target device, wherein, the initialization audio signal is the audio signal of the target characters obtained by encoding the source data of the initialization data for the smart home;

Decoding module 402, configured to decode the initialization audio signal according to the pre-stored correspondences between the pre-set characters and a source data of the pre-set characters, so as to obtain the source data of the initialization data, wherein the pre-set characters at least includes the target character; and Initialization module 403, configured to initialize the smart home according to the source data of the initialization data.

Figure 5:
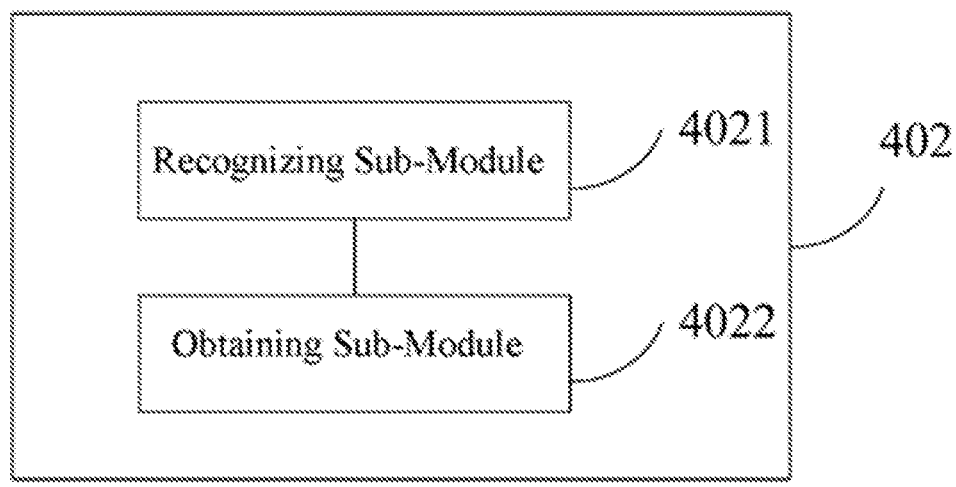
FIG. 5 is a block diagram illustrating another smart home initialization device according to an exemplary aspect of the present disclosure.

In one aspect, as shown in FIG. 5, the decoding module 402 shown in FIG. 4 may include a recognizing sub-module 4021 and an obtaining sub-module 4022.

The recognizing sub-module 4021 is configured to recognize the initialization audio signal to obtain the target character.

The obtaining sub-module 4022 is configured to obtain the source data of the initialization data according to the target characters as well as the correspondences between the pre-set characters and the source data of the pre-set character.

Figure 6:
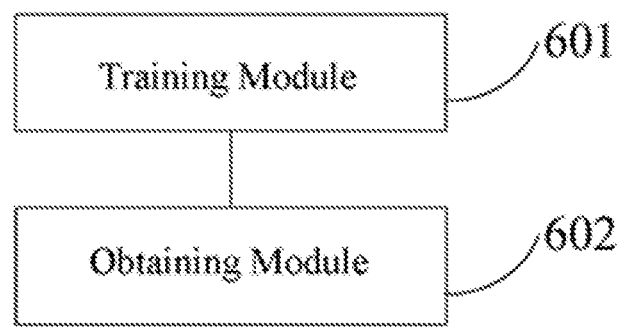
FIG. 6 is a block diagram illustrating yet another smart home initialization device according to an exemplary aspect of the present disclosure.

In one aspect, as shown in FIG. 6, the device may further include a training module 601 and an obtaining module 602.

The training module 601 is configured to train the smart home according to the audio signal of the pre-set characters, so that the smart home recognizes the pre-set characters before recognizing the initialization audio signal to obtain the target character.

The obtaining module 602 is configured to store the pre-set characters and the source data of the pre-set characters correspondingly, so as to obtain the correspondences.

In one aspect, the target characters are obtained from the target device by encoding the source data of the initialization data according to the correspondences between the pre-set characters and the source data of the pre-set characters.

In one aspect, the source data of the initialization data may include at least one of the following:

Binary code, octal code and hexadecimal code of the initialization data.

In one aspect, initializing the smart home according to the source data of the initialization data includes at least one of the following:

The smart home being controlled to be networked according to the source data of the initialization data;

Storing corresponding user information of the smart home according to the source data of the initialization data;

Displaying available functional options according to the source data of the initialization data.

According to the third aspect of the present disclosure, an initialization device for the smart home is provided, which includes:

A processor;

A memory configured to store instructions that are executable by the processor;

In the aspect, the processor is configured to:

Receive the initialization audio signal played by a target device, wherein the initialization audio signal is the audio signal of the target characters obtained by encoding the source data of the initialization data for the smart home;

Decode the initialization audio signal according to the pre-stored correspondences between the pre-set characters and a source data of the pre-set characters, so as to obtain the source data of the initialization data, wherein the pre-set characters at least includes the target characters;

Initialize the smart home according to the source data of the initialization data.

The processor may be further configured to:

Decode the initialization audio signal according to the pre-stored correspondences between the pre-set characters and a source data of the pre-set characters, so as to obtain the source data of the initialization data, wherein the decoding may include:

Recognizing the initialization audio signal to obtain the target character;

Obtaining the source data of the initialization data according to the target characters as well as the correspondences between the pre-set characters and the source data of the pre-set characters.

The processor may also be configured to:

Before recognizing the initialization audio signal, to obtain the target character, the obtaining may include:

Training the smart home according to the audio signal of the pre-set characters, so that the smart home recognizes the pre-set characters;

Storing the pre-set characters and the source data of the pre-set characters correspondingly, so as to obtain the correspondences.

The processor may also be configured in such a way that the target characters are obtained from the target device by encoding the source data of the initialization data according to the correspondences between the pre-set characters and the source data of the pre-set characters.

The processor above may also be configured in such a way that the source data of the initialization data includes at least one of the following:

Binary code, octal code and hexadecimal code of the initialization data.

The processor above may also be configured in such a way that initializing the smart home according to the source data of the initialization data includes at least one of the following:

The smart home being controlled to be networked according to the source data of the initialization data;

Storing corresponding user information of the smart home according to the source data of the initialization data;

Displaying available functional options according to the source data of the initialization data.

Figure 7:
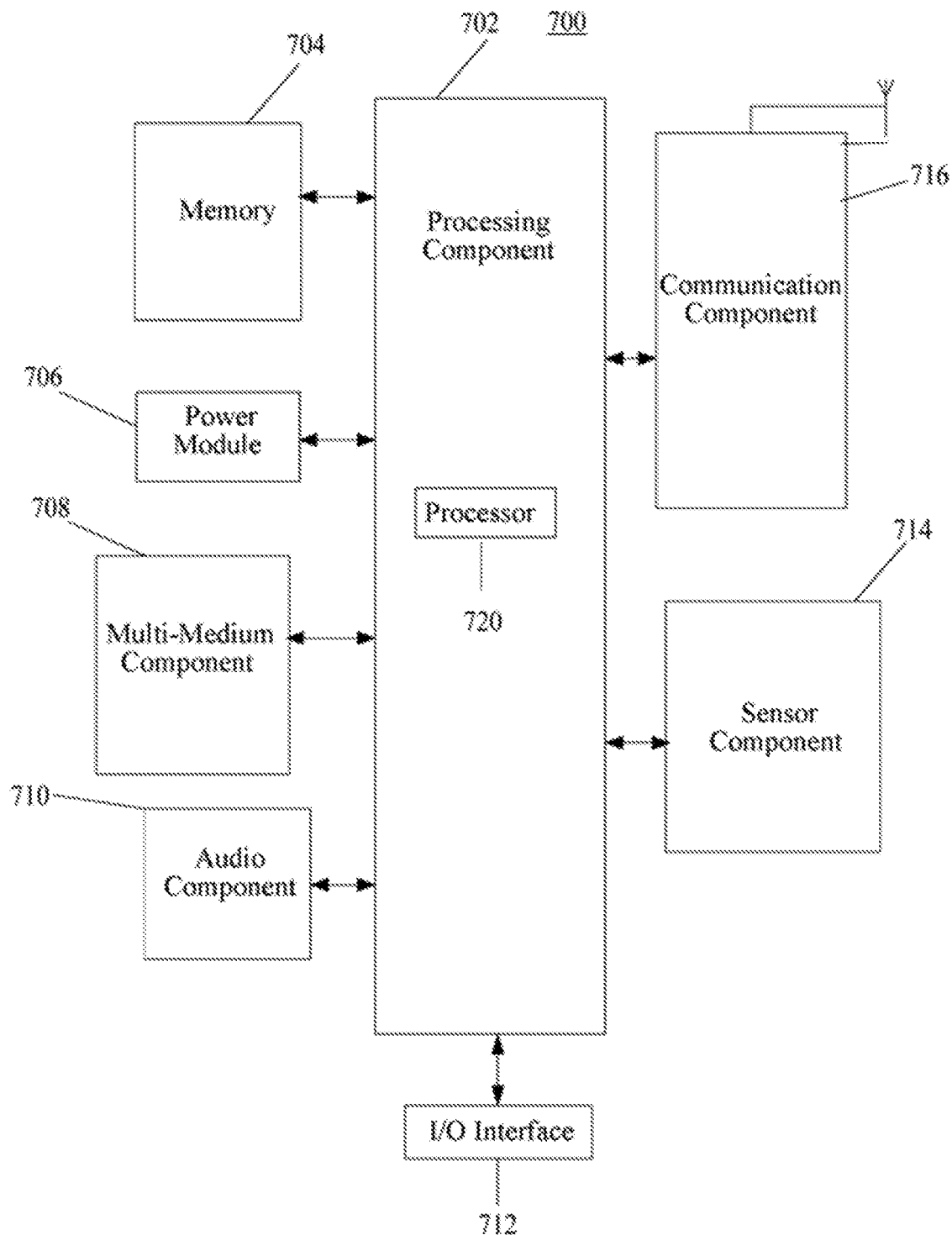
FIG. 7 is a block diagram illustrating an initialization device applied for a smart home according to an exemplary aspect of the present disclosure.

FIG. 7 is a block diagram illustrating an initialization device 700 for smart home according to an exemplary aspect, wherein the device is applicable for terminal devices. For example, device 700 may be a mobile phone, a computer, a digital broadcasting terminal, a message transceiver, a game console, a pad, a medical device, a fitness equipment, and PDA (personal digital assistance), and etc.

Referring to FIG. 7, the device 700 includes one or at least two components selected from: a processing component 702, a memory 704, a power module 706, a multi-medium component 708, an audio component 710, I/O interface 712, a sensor component 714 and a communication component 716.

The processing component 702 generally controls the entire operation of the control device 700, such as the operations associated with display, telephone call, data communication, camera operation and recording operation. The processing component 702 may include one or at least two processors 720 for executing instructions, so as to complete entire or part of the steps of the method as described above. In addition, the processing component 720 may include one or at least two modules for facilitating interactions between the processing component 702 and the other components. For example, the processing component 702 may include a multi-medium module for facilitating the interactions between the multi-medium component 708 and the processing component 702.

The memory 704 is configured to store various types of data for supporting operations of the device 700. Examples of such data may include instructions for various stored objects or methods performed by the device 700, users contact data, telephone contacts data, messages, photos, videos, and etc. The memory 704 can be embodied as any types of volatile or non-volatile storage devices or combination thereof, such as Static Random Access Memory (SRAM), Electrically Erasable Programmable Read-Only Memory (EEPROM), Electrically Programmable Read-Only Memory (EPROM), Programmable Read-Only Memory (PROM), Read-Only Memory (PROM), magnetic memory, flash memory, magnetic disc or compact disc.

The power module 706 supplies power for various components of the device 700. The power module 706 may include a power management system, one or at least two power sources, and other components related to the functions of power generation, power management and power distribution performed by the device 700.

The multi-medium 708 includes a screen proving an output interface between the device 700 and users. In some aspects, the screen may be a Liquid Crystal Display (LCD) or a Touchpad (TP). If the screen is embodied as a TP, the screen can be embodied as a touch screen to receive input signals from users. The Touch Pad includes one or at least two touch sensors to sense touching, sliding and gestures on the touch pad. The touch sensors can sense not only the gesture boundary of touching or sliding, but also the time duration and pressure relating with the touching or sliding. In some aspects, the multi-medium component 708 includes a front camera and/or a back camera. When the device is in an operation mode, such as a shooting mode or a video recording mode, the front camera and/or the back camera can receive multi-medium data from outside. Each of the front camera and back camera can be an optical lens system with a fixed or adjustable focal length.

The audio component 710 is configured to output and/or input audio signals. For example, the audio component 710 includes a microphone (MIC). When the device 700 is in an operation mode, such as a calling mode, a recording mode or a voice recognition mode, the microphone is configured to receive audio signals from outside. The audio signals received can be stored in the memory 704 or transmitted by the communication component 716. In some aspect, the audio component 710 may further include a speaker for outputting audio signals.

The I/O interface 712 provides an interface between the processing component 702 and peripheral interface modules. The peripheral interface modules can be keyboard, click wheel, buttons, and etc. The buttons may include but not limited to a homepage button, voice volume buttons, startup buttons and locking buttons.

The sensor component 714 includes one or at least two sensors, for providing state assessment for each aspect of the device 700. For example, the sensor component 714 can test open/close mode of the device 700, relative positioning of components. For example, if the component is the display and the keypad of the device 700, the sensor component 714 can test the position change of the device 700 or a component thereof, and also the existence or non-existence of the touch between a user and the device 700, the position or acceleration/deceleration of the device 700 and the temperature change of the device 700. The sensor component 714 may include a proximity sensor, which is configured to test the existence of objects nearby without any physical contacts. The sensor module 714 may further include optical sensors, such as CMOS OR CCD image sensors that are used in imaging applications. In some aspects, the sensor component 714 may further include acceleration sensors, gyroscope sensors, magnetic sensors, pressure sensors or temperature sensors.

The communication component 716 is configured to facilitate the wired or wireless communication of the device 700 and other devices. The device 700 can access wireless network based communication standard, such as, WiFi, 2G or 3G or a combination thereof. In one exemplary aspect, the communication component 716 receives broadcasting signals from outside broadcasting management system through broadcasting channels or broadcasts related messages. In one exemplary aspect, the communication component 716 further includes a Near Field Communication (NFC) module, so as to improve short-range communication. For example, the NFC module may be implemented based on Radio Frequency Identification (RFID) technique, Infrared Data Association (IrDA) technique, ultra wideband (UWB) technique, Bluetooth (BT) technique or other technique.

In exemplary aspects, the device 700 can be embodied by one or at least two Application Specific Integrated Circuit (ASIC), Digital Signal Processing (DSP), Digital Signal Processing Device (DSPD), Programmable Logic Device (PLD), Field Programmable Gate Array (FPGA), controllers, microcontrollers or other electronic components, to implement the method above.

In exemplary aspects, a computer readable storage medium is also provided, for example, instruction memory 704, with instructions executed by the processor 720 of the device 700 to implement the method above. For example, the non-temporary computer readable storage medium can be ROM, Random Access Memory (RAM), CD-ROM, a magnetic disc, a floppy disc and an optical data storage device, etc.

A non-temporary computer readable storage medium, enable the device 700 to implement the initialization method for the smart home, when the instructions in the storage medium are executed by the device 700 above, which includes:

Receiving an initialization audio signal played by a target device, wherein, the initialization audio signal is the audio signal of the target characters obtained by encoding the source data of the initialization data for the smart home;

Decoding the initialization audio signal according to the pre-stored correspondences between the pre-set characters and a source data of the pre-set characters, so as to obtain the source data of the initialization data, wherein, the pre-set characters at least includes the target character;

Initializing the smart home according to the source data of the initialization data.

In one aspect, the decoding the initialization audio signal according to the pre-stored correspondences between the pre-set characters and a source data of the pre-set characters, so as to obtain the source data of the initialization data, includes:

Recognizing the initialization audio signal to obtain the target character;

Obtaining the source data of the initialization data according to the target characters as well as the correspondences between the pre-set characters and the source data of the pre-set character.

In one aspect, before recognizing the initialization audio signal to obtain the target character, the method further includes:

Training the smart home according to the audio signal of the pre-set characters, so as the smart home recognizes the pre-set characters;

Storing the pre-set characters and the source data of the pre-set characters correspondingly, so as to obtain the correspondences.

In one aspect, the target characters is obtained from the target device by encoding the source data of the initialization data according to the correspondences between the pre-set characters and the source data of the pre-set characters.

In one aspect, the source data of the initialization data includes at least one of the following:

Binary code, octal code and hexadecimal code of the initialization data.

In one aspect, the initializing the smart home according to the source data of the initialization data, includes at least one of the following:

The smart home being controlled to be networked according to the source data of the initialization data;

Storing corresponding user information of the smart home according to the source data of the initialization data;

Displaying available functional options according to the source data of the initialization data.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for initializing a smart home device that is not networked and is to be initialized, comprising:
    obtaining, by a target device, target characters by encoding source data of initialization data for initializing the smart home device;
    playing an initialization audio signal by the target device, wherein the initialization audio signal is an audio signal of the obtained target characters;
    receiving, by the smart home device, the initialization audio signal played by the target device;
    decoding, by the smart home device, the initialization audio signal based on pre-stored correspondences between pre-set characters and source data of the pre-set characters so as to obtain the source data of the initialization data, wherein the pre-set characters include at least the target characters; and
    initializing the smart home device based on the source data of the initialization data.

2. The method according to claim 1, wherein decoding the initialization audio signal based on the pre-stored correspondences between the pre-set characters and the source data of the pre-set characters includes:
    recognizing the initialization audio signal to obtain the target characters; and
    obtaining the source data of the initialization data based on the target characters and the correspondences between the pre-set characters and the source data of the pre-set characters.

3. The method according to claim 2, wherein before recognizing the initialization audio signal to obtain the target characters, the method further includes:
- training the smart home device based on the audio signal of the pre-set characters so that the smart home device recognizes the pre-set characters; and
- storing the pre-set characters and the source data of the pre-set characters so as to obtain the correspondences.

4. The method according to claim 1, wherein the target characters are characters obtained from the target device by encoding the source data of the initialization data based on the correspondences between the pre-set characters and the source data of the pre-set characters.

5. The method according to claim 1, wherein the source data of the initialization data includes at least one of binary code, octal code, and hexadecimal code of the initialization data.

6. The method according to claim 1, wherein initializing the smart home device based on the source data of the initialization data includes at least one of:
- the smart home device being controlled to be networked based on the source data of the initialization data;
- storing corresponding user information of the smart home device based on the source data of the initialization data; and
- displaying available functional options based on the source data of the initialization data.

7. A device for initializing a smart home device that is not networked and is to be initialized, comprising:
- circuitry configured to:
  - obtain, by a target device, target characters by encoding source data of initialization data for initializing the smart home device;
  - play an initialization audio signal by the target device, wherein the initialization audio signal is an audio signal of the obtained target characters;
  - receive, by the smart home device, the initialization audio signal played by the target device;
  - decode, by the smart home device, the initialization audio signal based on pre-stored correspondences between pre-set characters and source data of the pre-set characters so as to obtain the source data of the initialization data, wherein the pre-set characters include at least the target character; and
  - initialize the smart home device based on the source data of the initialization data.

8. The device according to claim 7, wherein the circuitry is further configured to:
- recognize the initialization audio signal to obtain the target characters; and
- obtain the source data of the initialization data based on the target characters and the correspondences between the pre-set characters and the source data of the pre-set characters.

9. The device according to claim 8, wherein the circuitry is further configured to:
- train the smart home device based on the audio signal of the pre-set characters so that the smart home device recognizes the pre-set characters; and
- store the pre-set characters and the source data of the pre-set characters so as to obtain the correspondences.

10. The device according to claim 7, wherein the target characters are characters obtained from the target device by encoding the source data of the initialization data based on the correspondences between the pre-set characters and the source data of the pre-set characters.

11. The device according to claim 7, wherein the source data of the initialization data includes at least one of binary code, octal code and hexadecimal code of the initialization data.

12. The device according to claim 7, wherein the circuitry is configured to initialize the smart home device based on the source data of the initialization data by at least one of:
- the smart home device being controlled to be networked based on the source data of the initialization data;
- storing corresponding user information of the smart home device based on the source data of the initialization data; and
- displaying available functional options based on the source data of the initialization data.

13. A non-transitory computer-readable storage medium storing instructions that, when executed by one or more processors of a computing device, cause the computing device to:
- obtain, by a target device, target characters by encoding source data of initialization data for initializing a smart home device;
- play an initialization audio signal by the target device, wherein the initialization audio signal is an audio signal of the obtained target characters;
- receive, by the smart home device, the initialization audio signal played by the target device;
- decode, by the smart home device, the initialization audio signal based on pre-stored correspondences between pre-set characters and source data of the pre-set characters so as to obtain the source data of the initialization data, wherein the pre-set characters include at least the target character; and
- initialize the smart home device based on the source data of the initialization data.

\* \* \* \* \*